United States Patent [19]

Gruettner

[11] 4,063,547
[45] Dec. 20, 1977

[54] SOLAR HEATER

[76] Inventor: Henry Gruettner, 41 Valley Road, Levittown, Pa. 19057

[21] Appl. No.: 641,221

[22] Filed: Dec. 16, 1975

[51] Int. Cl.² ............................................. F24J 3/02
[52] U.S. Cl. ................................. 126/271; 237/1 A
[58] Field of Search ................ 126/270, 271; 237/1 A

[56] References Cited

U.S. PATENT DOCUMENTS

| | | | |
|---|---|---|---|
| 3,006,818 | 10/1961 | Lappala et al. | 126/271 |
| 3,022,781 | 2/1962 | Andrassy | 126/271 |
| 3,145,707 | 8/1964 | Thomason | 126/271 |
| 3,513,828 | 5/1970 | Masters | 126/271 |
| 3,859,980 | 1/1975 | Crawford | 126/271 |
| 3,991,742 | 11/1976 | Gerber | 126/271 |

Primary Examiner—Kenneth W. Sprague
Attorney, Agent, or Firm—Leonard L. Kalish

[57] ABSTRACT

A solar heater for heating water passing therethrough. The heater includes a corrugated radiant-heat absorbing panel slanted parallel to the corrugations, a liquid-delivery manifold-pipe along the upper end of the corrugated panel and having discharge apertures in operative registration with the upper ends of the upwardly-facing troughs of such corrugations, and a slotted envelope-protector and liquid-discharge pipe extending across and mounted to the lower edge-zone of the corrugated panel, with the lower edge-zone thereof extending into and tightly fitted in the slot of the pipe;— the upper liquid-supply manifold-pipe and the lower liquid-discharge pipe and the corrugated panel therebetween being fully enveloped by and sealed within a flexible envelope formed of pliable weather-resistant plastic sheeting, at least the top panel of which envelope is highly transparent.

6 Claims, 10 Drawing Figures

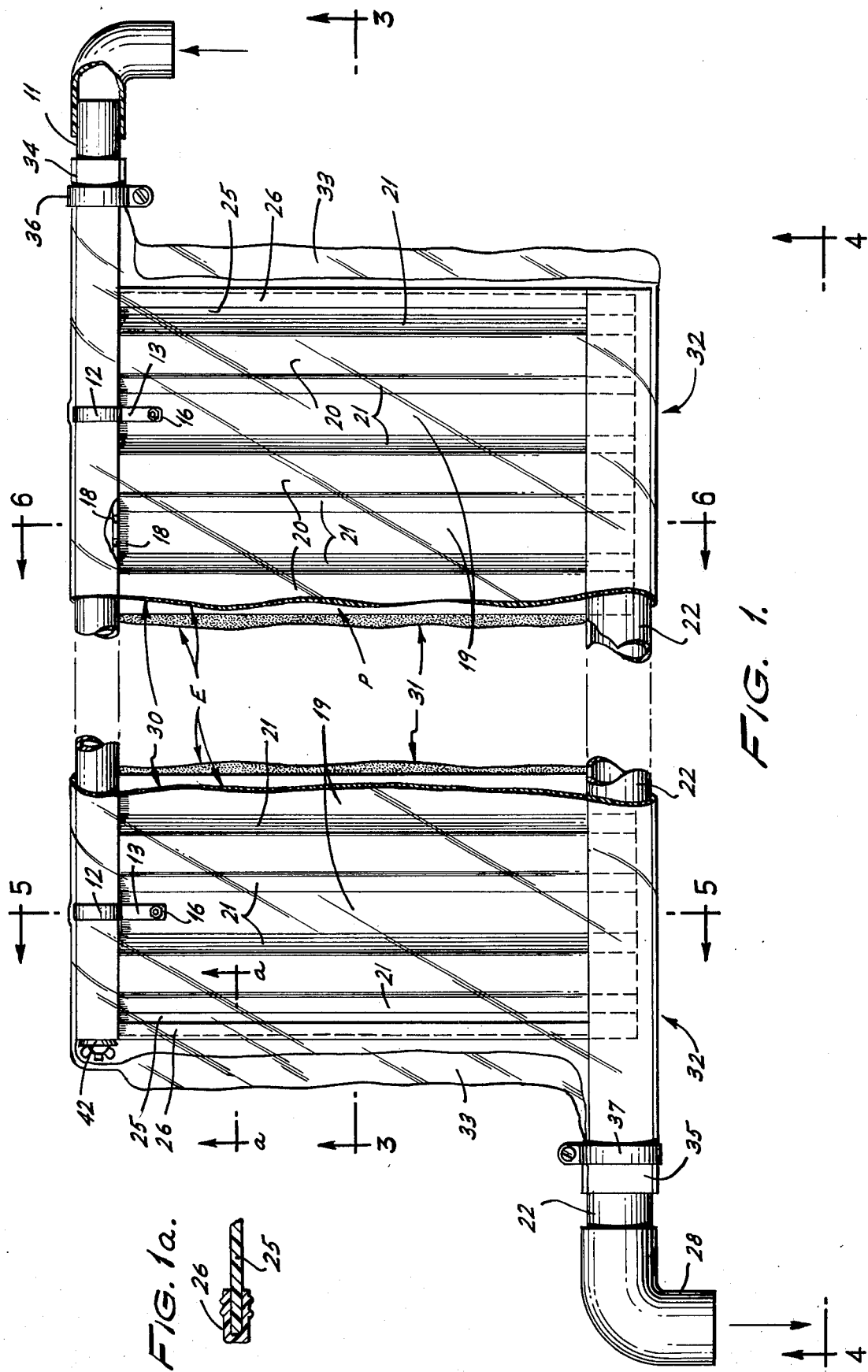

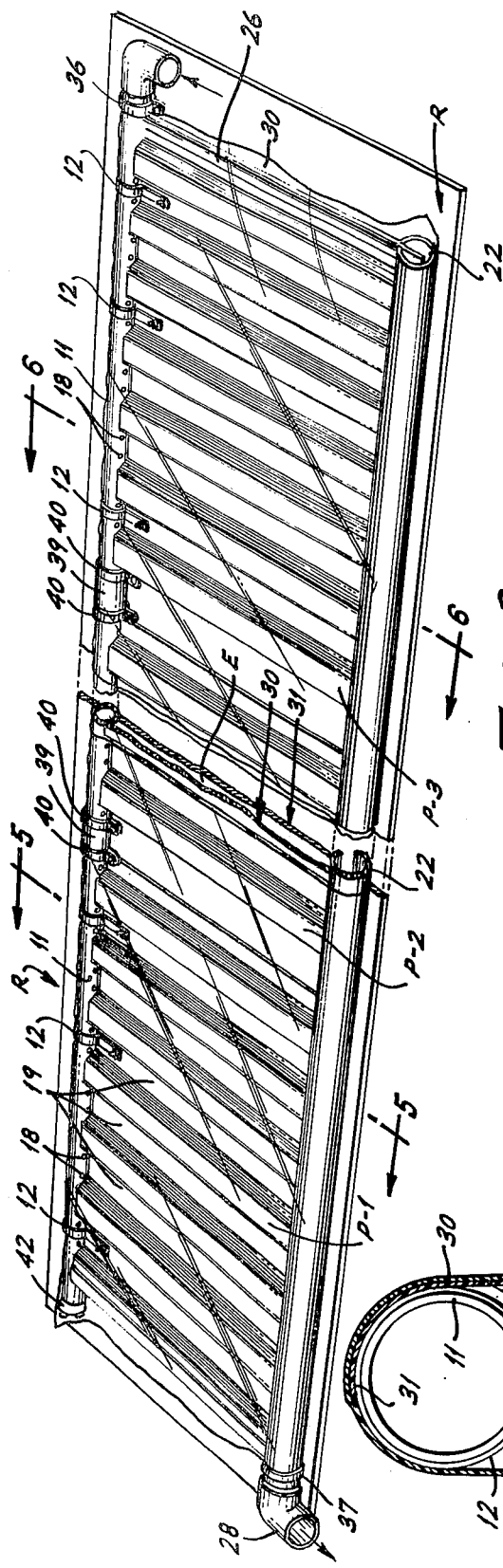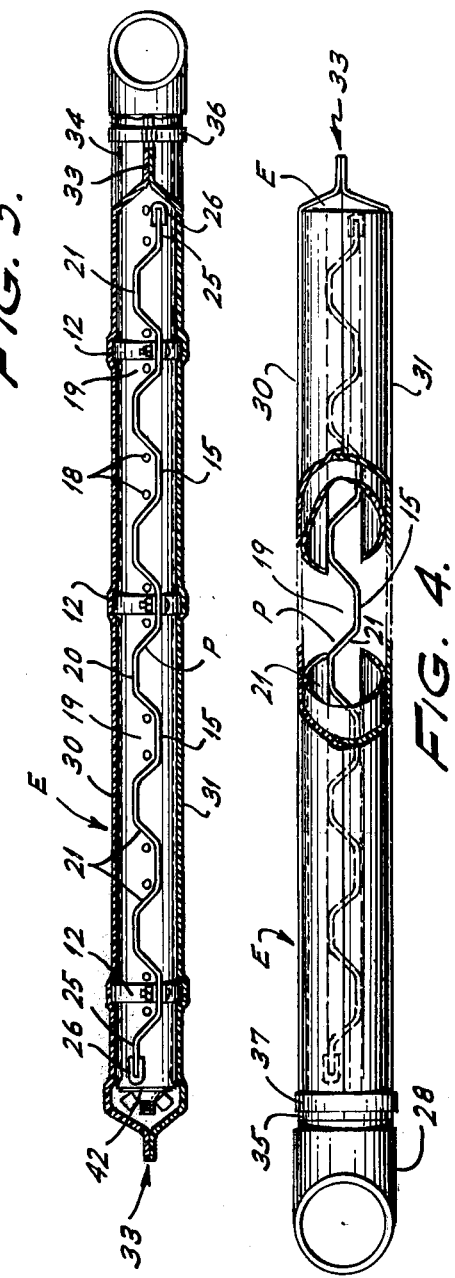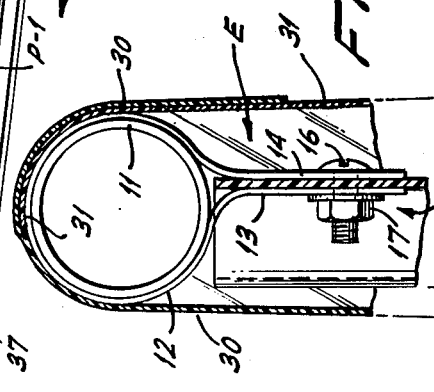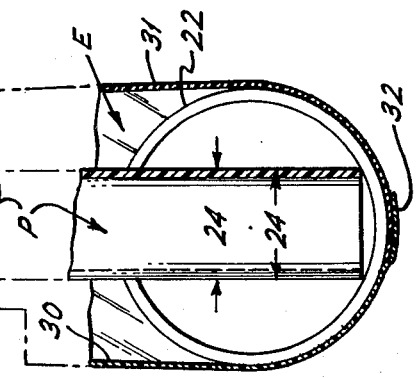

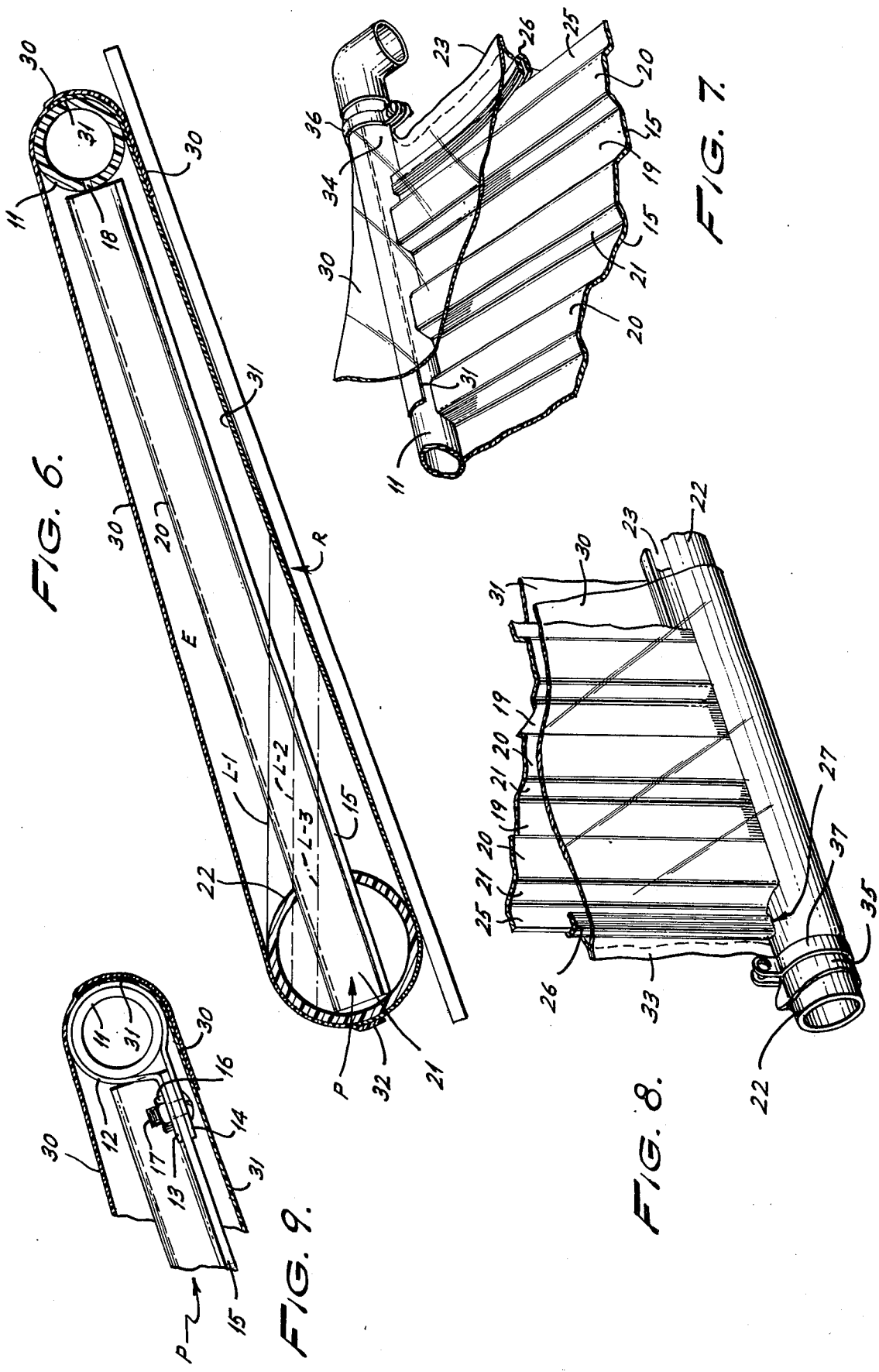

SOLAR HEATER

BRIEF SUMMARY OF THE INVENTION

The solar heater is positioned on a suitably slanted roof or on any other suitable slanted board or the like which is located sufficiently above the storage-reservoir for the heated liquid for effective gravity-drainage thereinto and which will so support the heater that the liquid-receiving end of the corrugated panel will be higher than the liquid-discharge end thereof so as to cause the liquid to flow down through the troughs of the corrugated panel with a sufficient rate of flow. The corrugated radiant-heat absorbing panel is preferably formed of sheet steel, at least the upper side of which is painted black with a flat black paint or coating so as to maximize its absorption of the radiant heat. An upper liquid-delivery manifold-pipe is secured to the upper edge of the corrugated panel by means of metallic straps or pipe clamps embracing the manifold-pipe and having extensions overlapping the upper end-zone of the panel, which extensions are secured to the corrugated panel by bolts or other suitable fastening means. A lower slotted plastic envelope-protecting and liquid-discharging pipe is mounted to the lower end of the corrugated panel. The lower edge-zone of the corrugated panel extends into the slotted pipe and is tightly fitted therein, with the free edges of the corrugations thereof bearing against the inner wall of the pipe. The upper liquid-delivery manifold-pipe as well as the lower envelope-protecting and liquid-discharging pipe are preferably dull black and made of high-density and impact-resistant polyvinyl chloride, although they can also be made of steel piping painted black for additional absorption of radiant heat.

The corrugated panel and the upper liquid-delivery manifold and the lower envelope-protecting and liquid-discharging pipe are fully enveloped or encased and sealed within a highly flexible and pliable plastic-sheet envelope. At least the top panel of such envelope is highly transparent to radiant heat.

The top and bottom panels of the flexible plastic envelope are heat-sealed to each other along the bottom of the envelope and along the two sides of the envelope and may also be heat-sealed to each other along the top of the envelope. However, the envelope is preferably effectively closed along the top thereof by folding the upper portion of the bottom panel thereof around the upper liquid-delivery manifold-pipe and then folding the upper portion of the top panel of the envelope downwardly and around the so upwardly-folded portion of the bottom panel of the envelope, so as to extend the upper portion of the top panel of the envelope a suitable distance beneath the upper zone of the heater, whereby the downwardly folded upper of the top panel of the envelope is clamped between the roof or (other heater-supporting panel) and the upwardly folded upper portion of the bottom panel of the envelope, and whereby the upwardly folded upper portion of the bottom panel of the envelope is clamped firmly between the downwardly folded upper portion of the top of the envelope and the upper liquid-supply manifold-pipe, thereby forming an effective seal between the upper portions of the top and bottom panels of the envelope.

At the upper inlet corner of the envelope the two plastic panels thereof are formed into a tubular pipe-receiving inlet-sleeve extending outwardly from that corner of the envelope, through which sleeve the upper liquid-delivery manifold-pipe extends and to which such inlet-sleeve of the envelope is sealed by a hose-clamp. The diagonally opposite lower discharge corner of the envelope is provided with an outlet-sleeve extending therefrom, through which the liquid-discharge pipe extends and to which it is sealed by means of a hose-clamp.

Such complete sealing of the envelope prevents the liquid from evaporating into the atmosphere and prevents the loss of heat which would result from evaporation, and such envelope also excludes the chill factor of the outside air, so that the heating of the liquid achieved by the absorption of radiant solar heat by the corrugated panel and the transference thereof to the liquid flowing down in the troughs of the corrugations will not be couner-acted or diminished by contact of any cooler outside air or by evaporation.

The liquid to be heated is passed through the so sealed heater without significant liquid pressure within the heater. The discharge orifices of the upper liquid-supply manifold-pipe, which are in alignment with the upwardly facing ends of the troughs of the corrugated panel, are of such size that their combined cross-sectional areas will be less than the cross-sectional area of the upper liquid-supply manifold-pipe by an amount just sufficient to cause the liquid issuing from such discharge-orifices to be projected into the troughs with slight velocity rather than merely dripping into the troughs or flowing down around the outer wall of the supply-manifold without going into the troughs.

The internal liquid-discharge pipe along the lower end of the corrugated panel is connected to a suitable external drain-pipe which carries the discharging liquid to a pressure-free storage-reservoir or to a swimming pool by gravity. The internal liquid-discharge pipe as well as the external drain-pipe are of a cross-sectional area such that no significant back-pressure is produced in the envelope, although a small pool of liquid may be maintained within the lower portion of the envelope, with the upper level thereof only a small distance above the internal liquid-discharge pipe. The liquid which may be so maintained in the bottom of the plastic envelope, is drawn off therefrom by gravity through the aforementioned internal liquid-discharge pipe and the external drain-pipe to which it is connected.

The following are the closest solar-heater patents of which I am aware, and my solar heater claimed hereinafter is believed to be patentable thereover: U.S. Pat. Nos. 807,642, 842,658, 1,258,405, 2,358,476, 3,022,781, 3,145,707, 3,146,774, 3,194,228, 3,215,134, 3,236,294, 3,369,539, 3,387,602. Other prior U.S. patents disclosing solar heaters which have come to my attention are believed to be too remote to justify their citation.

BRIEF DESCRIPTION OF THE DRAWINGS

FIG. 1 represents a top plan view of one embodiment of the present invention, with the solar heater in a horizontal position, although in use it is in the slanted position indicated in FIGS. 2, 6, 7 and 9.

FIG. 1a represents an enlarged fragmentary horizontal cross-sectional view on line a—a of FIG. 1.

FIG. 2 represents a perspective view of another embodiment of the present invention, in which the solar heater is in an inclined position, as in actual use.

FIG. 3 represents a cross-sectional view on line 3—3 of FIG. 1.

FIG. 4 represents an end elevational view of the solar heater shown in FIG. 1, as viewed on line 4—4 beneath FIG. 1.

FIG. 5 represents a cross-sectional view, on an enlarged scale, on line 5—5 of FIGS. 1 and 2.

FIG. 6 represents a cross-sectional view, on an enlarged scale, on line 6—6 of FIGS. 1 and 2.

FIG. 7 represents a fragmentary perspective view of the upper right-hand inlet corner of the solar heater shown in FIGS. 1 and 2, with the top transparent plastic sheet lifted up.

FIG. 8 represents a fragmentary perspective view of the lower left-hand discharge corner of the solar heater shown in FIGS. 1 and 2.

FIG. 9 represents a fragmentary cross-sectional view on line 5—5 of FIGS. 1 and 2, is similar to FIG. 5 but shown in the inclined position as in actual use.

DETAILED DESCRIPTION OF THE INVENTION

FIG. 1 shows a single-panel solar heater of the present invention in which a single corrugated steel panel P is provided within the flexible plastic envelope E, while FIG. 2 shows a multi-panel solar heater, namely, in which two or more corrugated steel panels P-1, P-2 and P-3 are provided within the same envelope E;—the envelope being sufficiently long (in a direction at a right-angle to the corrugation) to accommodate the several corrugated steel panels.

The single-panel solar heater shown in FIG. 1 as well as the multi-panel solar heater shown in FIG. 2 are mounted in an inclined position upon a suitably inclined roof R or like inclined support as indicated in FIGS. 1, 6, 7 and 9.

The corrugated steel panel P is painted black on its top side, with a flat black paint which maximizes its capacity for absorbing a radiant heat.

A liquid-delivery pipe 11 is secured to the upper edge of the corrugated panel P, by means of the steel bands 12 encircling the pipe 11, with their outwardly extending parallel ends 13 and 14 flanking the bottom spans 15 of the corrugated panel and secured thereto by means of the bolt 16 and nut 17.

One or more orifices 18 are provided in the wall of the liquid-delivery pipe 11, in registration with each of the upwardly facing troughs 19 of the corrugated panel P and arranged to project corresponding streams of liquid into the troughs near the upper ends thereof. The combined cross-sectional areas of the orifices 18 is just sufficiently less than the cross-sectional area of the delivery pipe 11, so that the liquid issuing from the orifices 18 will have a suitable though slight velocity to insure the delivery of the liquid into the troughs near the upper end thereof.

The corrugated panel P is composed of the coplanar flat bottom portions 15 and the coplanar upper flat portions 20 whose plane is parallel to the plane of the lower portions 15, and the oppositely inclined flat portions 21 intermediate to the bottom portions 15 and the upper portions 20. By facing the troughs 19 in a southerly direction, indicated by the arrow S in FIGS. 3, radiant heat of the sun will impinge on the bottom portions 15 and on at least one of the two inclined portions 21 of the troughs 19 throughout the passage of the sun from sunrise to sunset.

A pipe 22, having a slot 23 therein, is mounted to the lower edge-zone of the corrugated panel P as indicated in FIGS. 1, 2, 5 and 8. The width of the slot 23 is made sufficiently less than the maximum transverse dimension 24 of the corrugations (indicated in FIG. 5) so that the insertion of the lower edge-zone of the panel P into and through the slot will spread the slot sufficiently to clamp the pipe 22 onto the lower edge-zone of the corrugated panel.

Beyond the outermost corrugation at each of the opposite vertical ends of the panel P, a flat extension 25 is provided which lies in the same plane as that of either the first flat bottom portions 15 or the flat upper portions 20 of the panel P. A rubber or suitable plastic edge-guard 26 of U-shaped or C-shaped cross-section is mounted to the edges of the portions 25 and tightly engage same and serve to protect the envelope from the side-edge of the panel P.

The flat end portion 25 at the discharge side of the panel P extends into corresponding narrow terminal portion 27 of the slot 23 (FIG. 8).

The lower edge-zone of the panel P extends into the pipe 22 (through the slot 23 thereof) and may contact the inner surface of the pipe 22 as indicated in FIGS. 5 and 6. The pipe 22 serves both as a passageway through which the liquid is discharged into the drain-pipe 28 and also serves to space the envelope in relation to the corrugated panel and to prevent it from being cut by the edge of said panel.

The flexible plastic envelope E envelopes the pipes 11 and 22 and the corrugated panel P therebetween, and in which such pipes and panels are sealed, is formed of an upper clear transparent sheet of flexible plastic 30 and a lower or bottom plastic sheet 31, which may be transparent or opaque. The lower or bottom edge-zones of the upper and lower plastic sheets 30 and 31 overlap each other as indicated in FIGS. 5 and 6, and such overlapped marginal edge-zones thereof are heat-sealed to each other.

The opposite sides of the envelope E are similarly sealed by heat along the overlapping and contacting marginal zones 33 of the top and bottom sheets 30 and 31.

The flexible plastic envelope E envelopes the pipes 11 and 22 and the corrugated panel P therebetween, and such pipes and panels are sealed within the envelope, which is formed of an upper clear transparent sheet of flexible plastic 30 and a lower or bottom plastic sheet 31 which may be transparent or opaque. The lower or bottom edge-zones 32 of the upper and lower plastic sheets 30 and 31 overlap each other as indicated in FIGS. 5 and 6, and such overlapped marginal edge-zones thereof are heat-sealed to each other.

The opposite sides of the envelope E are similarly sealed by heat, along the overlapping marginal zones 33 of the top and bottom sheets 30 and 31. The so sealed marginal zones 33 extend outwardly from the envelope in the form of double-ply tabs or flanges 33.

The top and bottom plastic sheets 30 and 31 are extended at the upper inlet corner and at the lower outlet corner of the envelope E (FIGS. 1, 2, 7 and 8), and such extensions are formed into the inlet sleeve 34 and the outlet sleeve 35, respectively, by heat-sealing the edge-zones of such extensions to form said sleeves.

The liquid inlet or supply pipe 11 extends through the sleeve 34 and the latter is sealed to the pipe by the hose-clamp 36. The discharge pipe 22 extends through the sleeve 35 and is sealed thereto by the hose clamp 37.

The upper edge-zones of the top and bottom plastic sheets 30 and 31 may be heat-sealed to each other, although they are preferably sealed to each other by being pressed together by the weight of the pipe 11 and by the weight of the panel P which is supported by the pipe. Thus, the upper portion of the bottom plastic sheet 31 is folded upwardly against the pipe 11 and the upper portion of the top sheet 30 is folded downwardly over the up-turned portion of the bottom sheet 31 and is extended a slight distance beyond the bottom of the pipe 11, so that the weight of the pipe 31 (and of the panel P) will press the two sheets to each other and against the roof or supporting panel R.

In the multi-panel embodiment of the invention, the envelope E is made long enough to accommodate the panels P-1, P-2 and P-3 (or any other desired number of panels). In such case each panel is provided with its own upper supply-pipe 11 and its own bottom discharge-pipe 22. The adjacent supply-pipes 11 may be connected to each other with a suitable hose-connection 39, the opposite ends of which are secured to the facing ends of the supply-pipes 11 by means of hose-clamps 40. The adjacent lower discharge-pipes 22 need not be connected with each other because the bottom of the envelope E also serves as a conduit for the liquid to be discharged and ultimately empties the liquid into the discharge-pipe 22 which passes through the sleeve 35 and is connected to the drain pipe 28.

The bottom of the envelope E serves to collect the liquid, and some liquid may be maintained in the bottom of the envelope with the with the level L of the liquid being variable. Thus, it may be at the level indicated by the line L-1 or it may be at lower levels indicated by the dotted lines L-2 or L-3 or at a similar level.

The free end of the pipe 11 may be closed by any suitable pipe-plug 42, which may be an expandable plug comprising a cylindrical piece of rubber or the like fitting within the pipe and having a hole therethrough, with washers at the inner and outer ends thereof and a headed screw extending through the washer and through the plug, so that by tightening the nut the plug will be expanded so as to seal the end of the pipe.

Forming the plastic envelope with only the bottom and its two sides heat-sealed, and with the top of the envelope being sealed by the aforementioned interfolding of the upper portions of the bottom and top plastic sheets 31 and 30, permits the assembly of the pipes 11 and 27 and the intervening panel P (or multiples of such assembly) to be inserted into the envelope from the top and permits the subsequent sealing of the top of the envelope by the aforementioned interfolding of the upper portions of the bottom and top panels 31 and 30 of the envelope.

A plastic flange may be extended from the lower edge-zone of the bottom panel 31 of the envelope, and a similar flange may be extended from the upper portion of the top panel of the envelope, at such a level along said panels that when such flanges and the aforementioned side-flanges 33 are secured to the roof or other support panel R (by nails or screws or other fastening means), the solar heater will be securely held in place to prevent it from being dislodged by gravity or wind.

Such lower flange and such upper flange may be formed of a separate plastic sheet heat-sealed to the lower edge-zone of the bottom of panel 31 and to the upper portion of the top panel 30.

Among the advantages of the solar heater of the present invention are its low cost of manufacture and that it can be mounted on the roof or similar inclined support with lower labor cost.

However, in place of the aforementioned plastic anchorage-flanges I prefer to form anchorage-flanges or anchorages-flaps of a suitably woven tear-resistant fabric, woven of high-tensil nylon yarns or cords. Such woven nylon anchorage-flanges or flaps may be laminated between the outwardly extending side-edge zones 33 of the top and bottom vinyl or other suitable plastic panels 30 and 31 of the envelope and firmly secured in such lamination by heat-fusing such marginal zones of the envelope to the opposite sides of the nylon fabric. The bottom edge-zones of the two panels 30 and 31 of the envelope may likewise be extended outwardly, with another anchorage strip of woven nylon fabric laminated therebetween and secured therein by heat-fusing such vinyl edge-zones to the nylon anchorage strip. Along the top of the envelope E two narrow strips and vinly may be heat-seamed to the top panel 30 of the envelope, with another anchorage strip of woven nylon fabric laminated and heat-fused therebetween. Each of the four anchorage strips of nylon fabric is preferably extended the full length of the bottom, sides and top of the envelope and is made of a sufficient width so that it will reach and overlap the roof or panel R to a suitable extent so that it may be secured thereto by roofing nails or other suitable fasteners.

I may also provide additional hose clamps on the upper pipe 11 with the ends thereof extending upwardly and through suitable slots in the envelope, and with the tabs of the hose clamps extending outwardly into contact with the roof or panel R, to be secured thereto by nails or screws. The vinyl panels 30 and 31 of the envelope are made of sufficient thickness to give the envelope adequate strength. I have found that a thickness of the general order of 20 thousandths of an inch, more or less, is suitable. The bottom discharge pipe 22 is of substantially greater diameter then the upper supply pipe 11. Thus, for instance, with the upper supply pipe 11 having an inner diameter of 1½ inches, the bottom discharge pipe 22 would have an inner diameter of 2 inches.

The sealing of the envelope E need not be a pressure-resistant seal, but only a sufficient seal to prevent evaporation and chilling of the liquid and to maintain the heat within the envelope, because the discharge and drainage of the liquid is such that no actual pressure can develope within the envelope.

Having shown and described my invention, I claim the following:

1. A solar heater including an inclined corrugated radiant-heat-absorbing panel, with the troughs of the corrugations extending between the upper and lower edge-zones of the panel, a liquid-supply pipe affixed to the upper edge-zone of the corrugated panel and having orifices therein in registration with the upwardly-facing open ends of the troughs of the corrugated panel, a liquid-discharge pipe extending along and affixed to the lower edge zone of the corrugated panel and communicating with the troughs thereof, and a flexible plastic envelope enveloping said pipes and the corrugated panel therebetween, including an upper and a lower plastic panel, of which at least the upper one is transparent, said envelope having the bottom, side and top marginal zones of its two panels sealed to each other and having a sleeve at the inlet thereof through which the supply pipe extends and to which it is sealed and having a sleeve at the outlet thereof through which the discharge pipe extends and to which it is sealed.

2. A solar heater according to claim 1, in which the discharge pipe is slotted and into which slot the lower edge-zone of the corrugated panel extends.

3. A solar heater according to claim 1, including anchoring means extending from the envelope and arranged to be fastened to the roof or other support on which the solar heater is mounted.

4. A solar heater according to claim 1, in which the supply pipe is secured to the upper edge-zone of corrugated panel by straps encircling the supply pipe and having extensions flanking upper portions of the panel and secured thereto by screws.

5. A solar heater according to claim 1, in which the plastic envelope folds around and in contact with the outermost portion of the surface of the upper pipe which is bisected by the plane in which the axes of the two pipes lie.

6. A solar heater according to claim 1, in which the plastic envelope folds around and in contact with the outermost portions of the surfaces of the upper and lower pipes which are bisected by the plane in which the axes of the two pipes lie.

* * * * *